United States Patent [19]

Young et al.

[11] Patent Number: 4,992,991
[45] Date of Patent: Feb. 12, 1991

[54] MARINE SEISMIC RECEIVING SYSTEM EMPLOYING MULTIPLE DEPTH HYDROSTREAMER CABLE

[75] Inventors: Dewey R. Young, Houston; Richard E. Duren, Spring, both of Tex.

[73] Assignee: Exxon Production Research Company, Houston, Tex.

[21] Appl. No.: 443,065

[22] Filed: Nov. 28, 1989

Related U.S. Application Data

[63] Continuation of Ser. No. 265,248, Oct. 31, 1988, abandoned.

[51] Int. Cl.$^5$ ............................................... G01V 1/38
[52] U.S. Cl. ........................................ 367/20; 367/15; 181/110
[58] Field of Search ................. 181/110, 112; 367/15, 367/20, 24, 58

[56] References Cited

U.S. PATENT DOCUMENTS

| | | | |
|---|---|---|---|
| 2,757,356 | 7/1956 | Haggerty | 367/24 |
| 3,460,064 | 8/1969 | Giles et al. | 367/23 |
| 3,746,122 | 7/1973 | Davis | 367/56 |
| 3,838,390 | 9/1974 | Michon | 367/56 |
| 3,852,708 | 12/1974 | Doolittle et al. | 367/22 |
| 3,890,593 | 6/1975 | Davis | 367/20 |
| 3,906,352 | 9/1975 | Parker | 367/19 |
| 3,934,220 | 1/1976 | Davis | 367/56 |
| 4,020,447 | 4/1977 | Michon et al. | 367/20 |
| 4,064,479 | 12/1977 | Ruehle | 367/15 |
| 4,146,870 | 3/1979 | Ruehle | 367/20 |
| 4,254,480 | 3/1981 | French | 367/58 |
| 4,353,121 | 10/1982 | Ray et al. | 367/21 |
| 4,403,312 | 9/1983 | Thomason | 367/56 |
| 4,644,508 | 2/1987 | Zachariadis | 367/24 |
| 4,693,336 | 9/1987 | Newman | 181/111 |

FOREIGN PATENT DOCUMENTS

2180341  3/1987  United Kingdom ................. 367/20

OTHER PUBLICATIONS

"Marine Seismic Exploration Using Vertical Receiver Arrays...", Brink et al., 57th Ann. Soc. Exp. Geophy. Mtg., 10/11/87.
Microwave Scanning Antennas, vol. II, Array Theory and Practice, Edited by R. C. Hansen, 1966, Academic Press, NY and London, pp. 23-35.
Fields and Waves in Communication Electronics, Simon Ramo et al., 1965, John Wiley & Sons, Inc., New York, London and Sydney, pp. 688-689.
Microwave Antenna Theory and Design, Edited by Samuel Silver, 1965, Dover Publications, Inc., pp. 257-279.

*Primary Examiner*—Ian J. Lobo
*Attorney, Agent, or Firm*—Vaden, Eickenroht, Thompson & Boulware

[57] ABSTRACT

A marine seismic cable network including cables towed parallel to the surface of the sea at at least two depths for providing time analysis of reflected seismic data to dimensionally clarify characteristics of reflecting surfaces.

9 Claims, 1 Drawing Sheet

MARINE SEISMIC RECEIVING SYSTEM EMPLOYING MULTIPLE DEPTH HYDROSTREAMER CABLE

This application is a continuation of application Ser. No. 07/265,248, filed Oct. 31, 1988, now abandoned.

BACKGROUND OF THE INVENTION

1. Field of the Invention

This invention pertains to marine seismic receiving apparatus and in particular the use of multiple hydrostreamer cables for developing more definitive information from seismic reflections than obtainable from the use of a single hydrostreamer detection cable.

2. Description of the Prior Art

Current marine 2-D seismic surveys often utilize more than one hydrostreamer cable for reflection data gathering. A hydrostreamer cable, sometimes referred to as merely a streamer cable and sometimes also referred to as a hydrophone cable, is a long cable made up of sections having spaced therealong a plurality of hydrophones or hydrophone arrays for receiving reflected seismic reflections from the bottom of the sea and from subsurface interfaces. When more than one streamer is deployed by the same marine towing vessel, they are spaced apart and towed parallel to the surface of the water at the same depth or plane to give improved coverage. The usual depth of towing is about six meters underneath the surface of the sea.

The benefit from multiple-streamer surveys is that a swath-like coverage produces more data receiver points than can be provided by a single, linear cable and thereby allows the development of 3-D surveys. That is, hydrophones arranged in a plane allow improved seismic expression of the terrain subsurface or, in other words, allow the improved defining of dimensional characteristics of the terrain subsurface reflecting interfaces. In fact, the use of more than one streamer towed in a common plane has become sufficiently recognized as the means for the development of improved, definitive data, that the simultaneous towing in the same plane of three, four or even more cables is not uncommon.

It has been observed that swath-like land surveys have also proven to successfully provide more definition of subsurface characteristics than mere linear surveys, especially when directional geophones are utilized. A geophone is the term employed for a land survey sensor. It is well-known that such sensors or sensing instruments can be made and positioned for directional sensing. In more advanced and sophisticated land surveys, some geophones are aligned or positioned vertically, others are aligned horizontally and still others are aligned vectorily to allow for processing for azimuthal diffraction tracking.

In a marine environment, it is known that sea water will not support a shear wave front that is detectable by a horizontally aligned detector. Thus, at least one device, namely, a horizontally aligned detector, used in improving land survey information is not available. Marine surveys must rely, therefore, on high-quality compressional wave data.

As a result, sometimes even the best data developed using current marine detection procedures are confusing. For example, marine survey areas are often populated with fractured subsurface dipping beds that produce diffraction characteristics. Diffractions from out of a plane will interfere with energy returning from within such plane, thereby causing the mentioned confusion of data. Expensive 3-D surveys employing a dense coverage of the area with hydrophones are sometimes budgeted to permit the development of large amounts of data in a quantity sufficient to overcome the confusion and clarify the dimensional characteristics of the terrain subsurface covered by the survey.

Therefore, it is a feature of the present invention to provide for an improved marine seismic receiving apparatus capable of separating returning waveforms so as to provide dimensional clarification of subsurface terrain characteristics without an extensive number of receiver lines being required.

It is another feature of the present invention to provide for an improved marine seismic receiving apparatus including hydrostreamer cables towed at different depths.

SUMMARY OF THE INVENTION

The inventive marine seismic receiving apparatus for receiving acoustical seismic reflections described herein generally includes a towing vessel and at least three or four towed hydrostreamer cables positioned for being towed parallel to the surface of the sea at spaced apart position, at least two of the cables being towed at different depths. One configuration includes three cables, wherein one is towed at a shallow first depth and two cables are towed at a deeper second depth, such that the shallow cable is vertically midway between the deeper pair. Another configuration includes four cables. Two are at a shallow depth and the other two are at a deeper depth, the cables defining a rectangle when viewed from an end.

BRIEF DESCRIPTION OF THE DRAWINGS

So that the manner in which the above-recited features, advantages and objects of the invention, as well as others which will become apparent, are attained and can be understood in detail, more particularly description of the invention briefly summarized above may be had by reference to the embodiments thereof that are illustrated in the drawings, which drawings form a part of the specification. It is to be noted, however, that the appended drawings illustrate only preferred embodiments of the invention and are, therefore, not to be considered limiting of its scope for the invention may admit to other equally effective embodiments.

In the drawings

DESCRIPTION OF THE PREFERRED EMBODIMENTS

Figure 1:
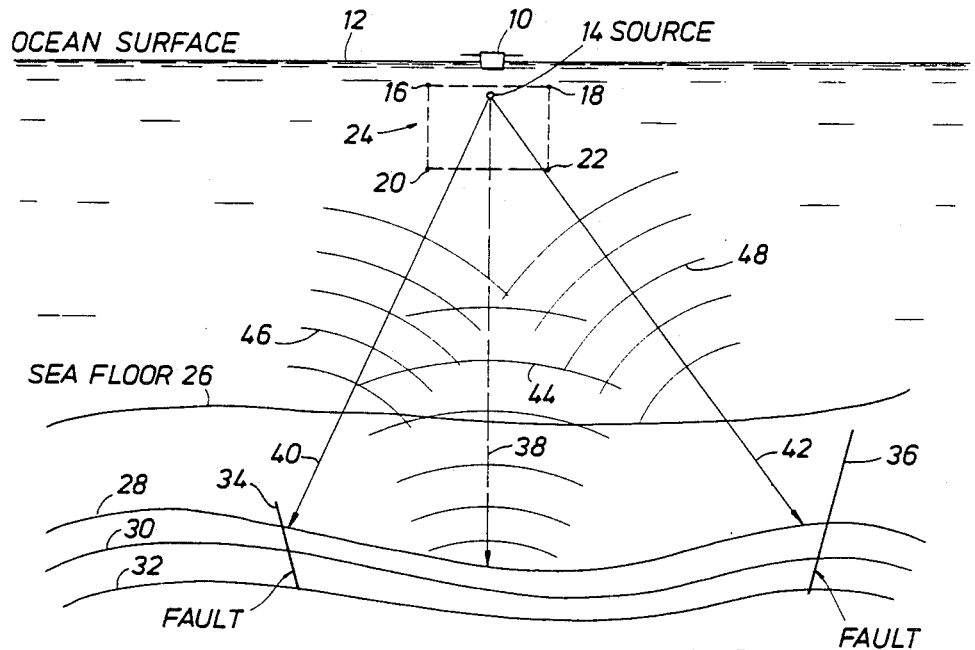
FIG. 1 is a plan view of a first preferred embodiment of the invention showing returning seismic reflections from subsurface terrain interfaces that includes dipping beds.

Now referring to the drawings, and first to FIG. 1, a plan view of a marine survey being developed in accordance with a first preferred embodiment of the invention is shown. The stern end of towing vessel 10 is shown as that vessel is located on the ocean surface 12. In typical fashion, the vessel is connected to a seismic source array 14 that is towed beneath surface 12, generally at a depth of about six meters. A typical seismic source includes one or more airguns, waterguns or the like for producing a defined acoustical signal into the water in a manner well-known in the marine seismic art.

Also towed by vessel 10 are four hydrostreamer cables 16, 18, 20, and 22, each including a plurality of hydrophones spaced along their respective lengths. Typically, such cables are comprised of a plurality of receiver groups, each group usually 15 to 30 meters in length, the entire length of a cable being generally 2 to 3 miles (3.2-4.8 km) long. Of course, any particular cable can vary from that length considerably.

The cables are configured to be towed as a network 24 such that cables 16 and 18 are towed at a shallow depth, typically at about six meters, and cables 20 and 22 at a much deeper level, typically at about 25-35 meters. Cables 16 and 18 are positioned so that vessel 10 is midway between them and cables 20 and 22 are positioned so that vessel 10 is also midway between them. Cables 16 and 18 are spaced apart at a distance of typically approximately 60 meters, as are cables 20 and 22. Thus, network 24 consists of four cables that form a rectangle (or nearly so since cables 20 and 22 can be slightly further apart than are cables 16 and 18). All of the cables are towed so that the cables reside parallel to the ocean surface.

Located beneath the vessel is sea floor 26 and the subsurface terrain interfaces, such as interfaces 28, 30 and 32. It should be noted that for purposes of illustration, there is a fault 34 shown at the left side of the drawing and another fault 36 shown at the right side. The terrain interfaces steeply dip toward the center of the drawing from these fault locations.

An acoustical seismic signal produced from source 14 emanates downwardly from source 14 along paths 38, 40, and 42. Path 38 is vertically straight down. Paths 40 and 42 depict paths that are generally normal to at least a portion of the respective dipping interfaces in the subsurface formation. As is well known, seismic reflections occur from each of the incidence paths shown, these reflections being illustrated as reflected radiation patterns 44, 46, and 48 corresponding to and resulting from incidence paths 38, 40, and 42, respectively. It may be seen that rising pattern 44, for example, is received at cables 20 and 22 at about the same time followed by nearly simultaneous receipt at cables 16 and 18. By contrast, rising pattern 46 is received by cable 20, then by cables 16 and 22 (the delay therebetween depending on the steepness of the reflecting dipping beds), and then finally by cable 18. By further contrast, rising pattern 48 first encounters cable 22, then cables 18 and 20, and finally cable 16. The reflections off the ocean surface are also received. The redundant data can be used to allow the reflecting interfaces or beds to be dimensionally clarified compared with the definition determinable by a single cable survey or a survey from multiple cables located in a common plane.

Figure 2:
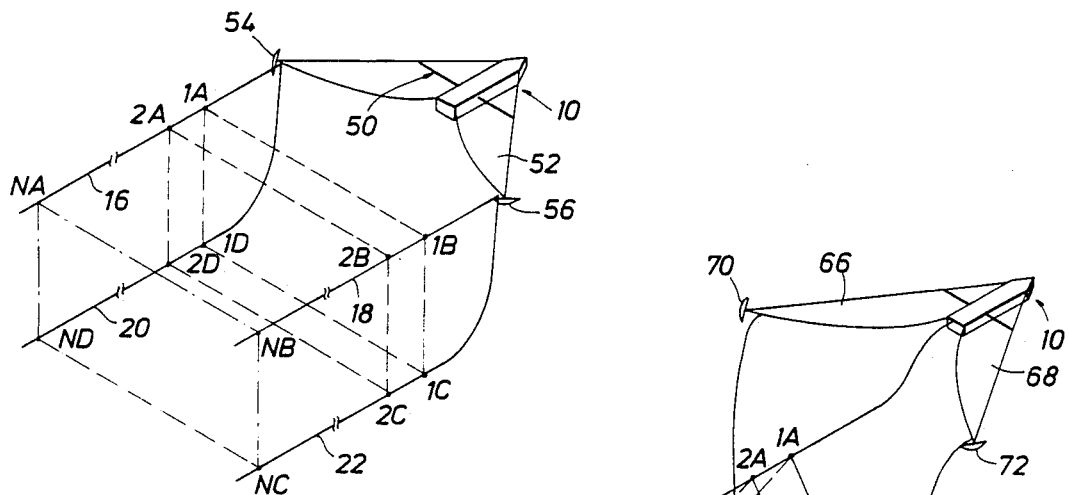
FIG. 2 is a perspective view of the embodiment of the invention shown in FIG. 1.

Now referring to FIG. 2, it may be seen that the positioning and spacing of cables 16, 18, 20, and 22 is further illustrated. Booms 50 and 52 connected to vessel 10, along with conventional mine sweep paravanes 54 and 56, provide the spread connections for cables 16 and 18 and for cables 20 and 22. The buoyancy characteristics and the fairing connections determine the respective towing depths for the cables, all of which is well-known in the art for single cable towing.

Spaced along cable 16 are hydrophones 1A, 2A, . . . , NA. Spaced along cable 18 are hydrophones 1B, 2B, . . . , NB. Spaced along cable 22 are hydrophones 1C, 2C, . . . , NC. Finally, spaced along cable 20 are hydrophones 1D, 2D, . . . , ND. It may be seen that four respective hydrophones included respectively in the four cables form a rectangle of hydrophones, or a hydrophone set, that yield the directional information for the reflected waves, as discussed above. From the information provided by all of the respective hydrophone sets, a great deal of reflecting subsurface definition is possible. In fact, since each hydrophone or hydrophone array in a cable is separately recorded, further investigation is possible from other existing geometric relationships of the hydrophones beyond the relationships just defined.

Figure 3:
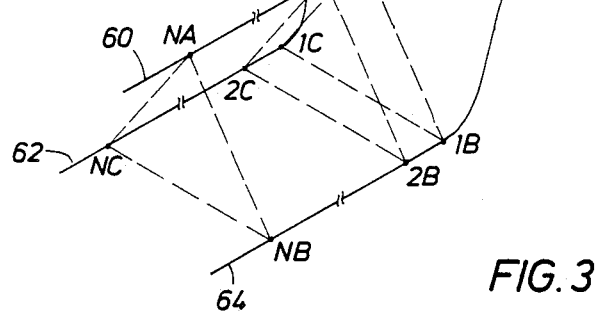
FIG. 3 is a perspective view of a second preferred embodiment of the invention.

Now referring to FIG. 3, another embodiment of the invention is illustrated, wherein vessel 10 is shown towing cable 60 at a shallow depth of about six meters and cables 62 and 64 each at a deeper depth of about 25-35 meters. Cable 60 is towed directly behind vessel 10 and midway between cables 62 and 64, held in their locations by booms 66 and 68 and paravanes 70 and 72, respectively. Hydrophones 1A, 2A, . . . , NA along cable 60; hydrophones 1B, 2B, . . . , NB along cable 62; and hydrophones 1C, 2C, . . . , NC along cable 64 form respective hydrophone sets of three in a triangle configuration to provide the clarifying information capable of development by three such configured cables.

Wavelet directionality is determined by analysis of the direct and surface reflected signals into the network of cables. Moreover, the actual separation distances of the cables for the configurations shown in FIGS. 2 and 3 can be field controllable for maximum wavelet direction identification.

While two embodiments have been described and illustrated it will be understood that the invention is not limited thereto, since many modifications may be made and will become apparent to those skilled in the art. For example, more than four cables can be towed and the respective cables can be towed at more than two depths.

What is claimed is:

1. Marine seismic receiving apparatus for receiving direct acoustical seismic reflections from seismic reflecting interfaces, comprising a towing vessel, and a plurality of at least three hydrostreamer cables connected to said vessel, each of said cables having a plurality of hydrophone detectors spaced therealong, said cables being provisioned for towing so that at least one of said cables is towed at a depth different from the other of said cables, thereby placing detectors from different ones of said cables in a vertically dispersed arrangement in a plane different from a plane longitudinally parallel with said cables, thus forming a multisided geometrical configuration defined by respective ones of said detectors from each of said cables establishing an array for determining directionality of a common wavefront detected by said respective detectors.

2. Marine seismic receiving apparatus in accordance with claim 1, wherein the hydrophone detectors spaced along each of said hydrostreamer cables respectively correspond with each other.

3. Marine seismic receiving apparatus for receiving direct acoustical seismic reflections from seismic reflecting interfaces, comprising a towing vessel, and a plurality of three hydrostreamer cables connected to said vessel, each of said cables having a plurality of hydrophone detectors spaced therealong, said cables being provisioned for towing so that a first cable thereof is towed at a first depth and the other two cables are towed at a second depth such that said first cable is vertically approximately midway between said two cables at said second depth, thereby placing detectors from different ones of said cables in a vertically dispersed arrangement in a plane different from a plane longitudinally parallel with said cables, thus forming a multisided geometrical configuration defined by respective ones of said detectors from each of said cables establishing an array for determining directionality of a common wavefront detected by said respective detectors.

4. Marine seismic receiving apparatus for receiving direct acoustical seismic reflections from seismic reflecting interfaces, comprising
    a towing vessel, and
    a plurality of four hydrostreamer cables connected to said vessel, each of said cables having a plurality of hydrophone detectors spaced therealong, said cables being provisioned for towing so that a first two of said cables are towed at a first depth and a second two of said cables are towed at a second depth such that said first two cables are respectively vertically positioned over said second two cables, thereby placing detectors from different ones of said cables in a vertically dispersed arrangement in a plane different from a plane longitudinally parallel with said cables, thus forming a multisided geometrical configuration defined by respective ones of said detectors from each of said cables establishing an array for determining directionality of a common wavefront detected by said respective detectors.

5. The marine seismic method of detecting at different time sequences the reflections from seismic reflecting interfaces depending on the respective angles of normal reflection from each such reflecting interface, which comprises
    energizing a seismic source towed behind a towing vessel,
    receiving at a first depth at the detectors of at least one hydrostreamer cable towed behind the towing vessel, each first depth cable having a plurality of acoustical seismic detectors spaced therealong, and
    receiving at a second depth at the detectors of at least one hydrostreamer cable towed behind the towing vessel, each second depth cable having a plurality of acoustical seismic detectors spaced therealong, the number of the cables towed at said first and second depths being at least three, detectors in the different cables defining at least one plane of detectors different from a plane longitudinally parallel with the towing direction of the cables, said detectors in the plane further defining a planar multisided geometric configuration with detectors at the corners thereof for detecting reflected wavefronts at normal angles respectively from a plurality of interfaces, each respective reflected wavefront being received by the detector in the planar configuration closest to the related reflecting interface as determined by the normal direction thereto and then sequentially later by the detectors further therefrom as the reflected wavefront passes thereby.

6. The marine seismic method in accordance with claim 5, wherein a single cable is towed behind the towing vessel at the first depth and two cables are towed behind the towing vessel at the second depth, the single cable at the first depth being approximately midway between the cable at the second depth.

7. The marine seismic method in accordance with claim 5, wherein two cables are towed behind the towing vessel at the first depth and two cables are towed behind the towing vessel at the second depth, the two cables at the first depth being respectively approximately vertically deployed over the two cables at the second depth.

8. The marine seismic method in accordance with claim 5, wherein the first depth is approximately six meters below the water surface and the second depth is in the range of 25-35 meters below the water surface.

9. The marine seismic method in accordance with claim 5, wherein the planar multisided geometric configuration of detectors from different cables is normal to the towing direction of the cables.

* * * * *